US012693236B2

(12) United States Patent
Kim et al.

(10) Patent No.: US 12,693,236 B2
(45) Date of Patent: Jul. 28, 2026

(54) MONITORING APPARATUS AND OPERATION METHOD THEREOF

(71) Applicant: LG ENERGY SOLUTION, LTD., Seoul (KR)

(72) Inventors: Min Ji Kim, Daejeon (KR); Dong Hwan Eom, Daejeon (KR); Seung Gyun Hong, Daejeon (KR); Seung Jun Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 123 days.

(21) Appl. No.: 18/714,045

(22) PCT Filed: Jan. 10, 2023

(86) PCT No.: PCT/KR2023/000447
§ 371 (c)(1),
(2) Date: May 28, 2024

(87) PCT Pub. No.: WO2023/136584
PCT Pub. Date: Jul. 20, 2023

(65) Prior Publication Data
US 2024/0353348 A1     Oct. 24, 2024

(30) Foreign Application Priority Data
Jan. 14, 2022     (KR) ........................ 10-2022-0005799

(51) Int. Cl.
G01N 21/88 (2006.01)
B23K 31/12 (2006.01)
G06T 7/00 (2017.01)
(52) U.S. Cl.
CPC ....... G01N 21/8851 (2013.01); B23K 31/125 (2013.01); G06T 7/0008 (2013.01);
(Continued)

(58) Field of Classification Search
CPC ....... G01N 21/8851; G01N 2021/8854; B23K 31/125; G06T 7/0008; G06T 7/001; G06T 2207/20081; G06T 2207/20084
See application file for complete search history.

(56) References Cited

U.S. PATENT DOCUMENTS

2018/0361514 A1     12/2018     Narayanan et al.
2021/0158077 A1     5/2021     Tai et al.
(Continued)

FOREIGN PATENT DOCUMENTS

CN     113592813 A     11/2021
CN     113837991 A     * 12/2021     ............... G06T 7/70
(Continued)

OTHER PUBLICATIONS

Extended European search report issued on Apr. 1, 2025 in corresponding European patent Application No. 23740428.0 (Note: WO 2021/185404 A1 cited in this EESR was cited in a prior IDS.).
(Continued)

*Primary Examiner* — Georgia Y Epps
*Assistant Examiner* — Don J Williams
(74) *Attorney, Agent, or Firm* — Morgan, Lewis & Bockius LLP

(57) ABSTRACT

A monitoring apparatus according to an example embodiment disclosed in this document may include an image acquisition unit configured to acquire an image of at least one process processing device related to manufacturing of a battery cell, an analyzer configured to input the acquired image into an artificial intelligence model for determining a welding state of the battery cell to generate a first determination result of determining whether the battery cell is defective, and a determination unit configured to determine whether the battery cell is defective based on the first determination result.

12 Claims, 9 Drawing Sheets

(52) U.S. Cl.
CPC ...... G06T 7/001 (2013.01); *G01N 2021/8854*
*(2013.01); G01N 2021/8887* (2013.01); *G06T*
*2207/20081* (2013.01); *G06T 2207/20084*
(2013.01)

(56) References Cited

U.S. PATENT DOCUMENTS

| | | |
|---|---|---|
| 2021/0252638 A1 | 8/2021 | Roh et al. |
| 2021/0265673 A1 | 8/2021 | Jordan et al. |
| 2022/0410324 A1 | 12/2022 | Hanada et al. |
| 2024/0123548 A1 | 4/2024 | Roh et al. |

FOREIGN PATENT DOCUMENTS

| | | | | |
|---|---|---|---|---|
| CN | 114399484 A | * | 4/2022 | ........... G06F 18/214 |
| KR | 10-2018-0138160 A | | 12/2018 | |
| KR | 10-2019-0063839 A | | 6/2019 | |
| KR | 10-2019-0089369 A | | 7/2019 | |
| KR | 10-2059272 B1 | | 12/2019 | |
| KR | 10-2020-0037932 A | | 4/2020 | |
| KR | 10-2021-0062477 A | | 5/2021 | |
| KR | 10-2260734 B1 | | 6/2021 | |
| KR | 10-2021-0104547 A | | 8/2021 | |
| KR | 10-2021-0106038 A | | 8/2021 | |
| KR | 10-2294189 B1 | | 8/2021 | |
| WO | 2021/177435 A1 | | 9/2021 | |
| WO | 2021/185404 A1 | | 9/2021 | |

OTHER PUBLICATIONS

International Search Report (with partial translation) and Written Opinion dated Apr. 18, 2023, for corresponding International Patent Application No. PCT/KR2023/000447.

Office Action issued on Aug. 26, 2025 in corresponding Korean Patent Application No. 10-2023-0003585.

Khumaidi et al., "Welding Defect Classification Based on Convolution Neural Network (CNN) and Gaussian Kernel," 2017 International Seminar on Intelligent Technology and Its Applications (ISITIA), Aug. 29, 2017, https://ieeexplore.ieee.org/document/8124091.

Office Action issued on Jul. 1, 2025 in Japanese Patent Application No. 2024-540770 (Note: WO 2021/185404 A1 cited in this JP Office Action has already been cited in a prior IDS.).

* cited by examiner

FIRST PROCESS
PROCESSING DEVICE
(210)

SECOND PROCESS
PROCESSING DEVICE
(220)

THIRD PROCESS
PROCESSING DEVICE
(230)

MONITORING
APPARATUS
(100)

| CLASSIFICATION | TYPE#1 | TYPE#2 | TYPE#3 | TYPE#4 |
|---|---|---|---|---|
| | WELDED 100%<br>(2line) | WELDED SECTION 75%↑<br>(1line) | WELDED SECTION 50%↑<br>(1line) | WELDED SECTION 50%↓<br>(1line) |
| INSPECTED<br>IMAGE | | | | |
| TENSILE STRENGTH<br>(Ave.) | 1.90kgf | 1.61kgf | 1.10kgf | 0.73kgf |
| WEAK WELD<br>SECTION | NORMAL<br>WELDING | NORMAL<br>WELDING | WEAK WELDING<br>(RISKY SECTION) | WEAK<br>WELDING |

MONITORING APPARATUS AND OPERATION METHOD THEREOF

CROSS-REFERENCE TO RELATED APPLICATION

This application is a U.S. National Stage of PCT International Application No. PCT/KR2023/000447, filed on Jan. 10, 2023, which claims priority to Korean Patent Application No. 10-2022-0005799, filed Jan. 14, 2022, the entire contents of which is incorporated herein for all purposes by this reference.

TECHNICAL FIELD

Example embodiments disclosed in this document relate to a monitoring apparatus and an operation method thereof.

BACKGROUND ART

Electric vehicles receive power from the outside to charge the battery cells, and then drive the motor with the voltage charged in the battery cells to obtain power. A battery cell of an electric vehicle is manufactured by accommodating an electrode assembly in a battery case and injecting an electrolyte into the battery case.

Battery cells are classified into cylindrical, prismatic, and pouch types according to the type of battery case, the cylindrical battery cell includes an electrode assembly, a battery case of a cylindrical metal can accommodating the electrode assembly and an electrolyte, and a cap assembly assembled on top of the cylindrical can.

Here, the cathode tab of the cylindrical battery cell is welded to the top cap of the cap assembly. However, if the welded portion is partially or entirely removed due to an impact applied from the outside of the battery cell or due to defective welding, the battery cell may deteriorate or explode. Therefore, it is important to inspect battery cells to ensure that defectively welded battery cells do not leak.

DETAILED DISCLOSURE

Technical Objective

It is an object of the example embodiments disclosed in this document to provide a monitoring apparatus capable of detecting a defective battery cell by accurately analyzing a welding state of the battery cell and an operation method thereof.

The technical objects of the example embodiments disclosed in this document are not limited to the aforesaid, and other objects not described herein with be clearly understood by those skilled in the art from the descriptions below.

Technical Solution

A monitoring apparatus according to an example embodiment disclosed in this document may include an image acquisition unit configured to acquire an image of at least one process processing device related to manufacturing of a battery cell, an analyzer configured to input the acquired image into an artificial intelligence model for determining a welding state of the battery cell to generate a first determination result of determining whether the battery cell is defective, and a determination unit configured to determine whether the battery cell is defective based on the first determination result.

An operation method of a monitoring apparatus according to an example embodiment disclosed in this document may include acquiring an image of at least one process processing device related to manufacturing of a battery cell, generating a first determination result of determining whether the battery cell is defective by inputting the acquired image to an artificial intelligence model configured to determine a welding state of the battery cell, generating a second determination result of determining whether the battery cell is defective based gray level information of the acquired image, and determining whether the battery cell is defective based on the first and second determination results.

Advantageous Effects

The monitoring apparatus and an operation method thereof according to an example embodiment disclosed in this document is capable of detecting a defective battery cell by accurately analyzing the welding state of the battery cell.

BRIEF DESCRIPTION OF DRAWINGS

FIG. 3 is a welding state classification table according to an example embodiment disclosed in this document;

MODES FOR PRACTICING INVENTION

Figure 1:
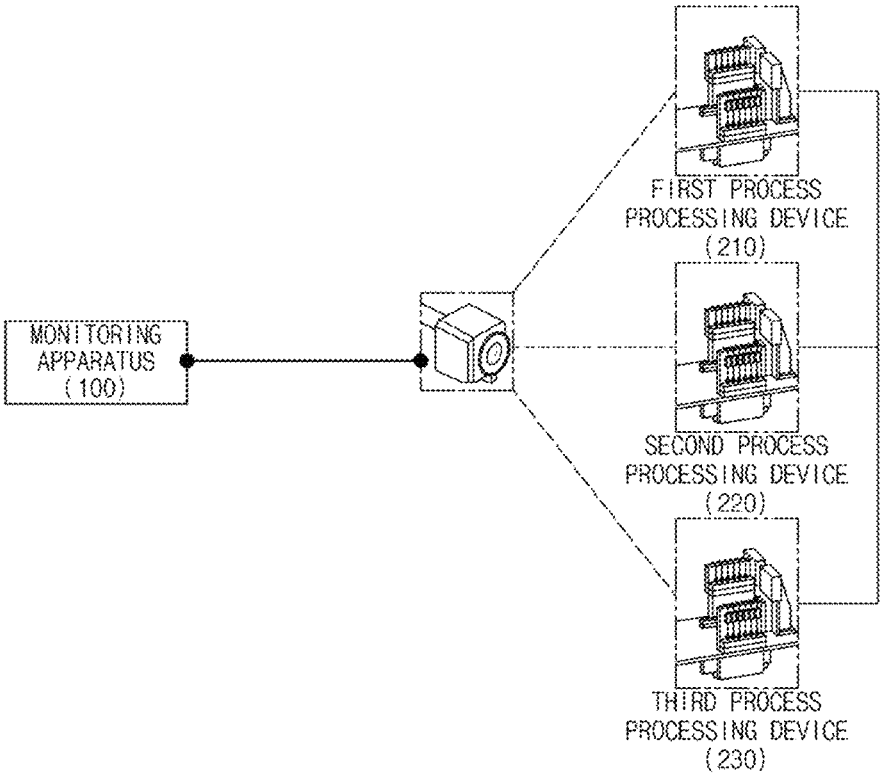
FIG. 1 is a diagram for describing a battery processing system according to an example embodiment disclosed in this document.

Hereinafter, example embodiments disclosed in this document will be described in detail with reference to example drawings. In assigning reference numerals to the components of each drawing, it should be noted that the same components have the same reference numerals as much as possible even if they are displayed in different drawings. Detailed description of a well-known structure or function incorporated in the example embodiments disclosed in this document may be omitted to avoid obscuring the understanding of the example embodiments disclosed in this document.

Terms such as "the first", "the second", "A", "B", "(a)", and "(b)" may be used to describe components of the example embodiments disclosed in this document. These terms are only used only to distinguish one component from another component, and the nature, sequence, or order of the corresponding components are not limited by the term.

Unless otherwise defined herein, all terms including technical or scientific terms used herein have the same meanings as commonly understood by those skilled in the art to which the example embodiments disclosed in this document belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

According to various example embodiments, a battery may include a battery cell, which is a basic unit of a battery capable of charging and discharging electrical energy. The battery cell may be a lithium ion (Li-ion) battery, a lithium ion polymer (Li-ion polymer) battery, a nickel cadmium (Ni—Cd) battery, a nickel-metal hydride (Ni-MH) battery, and the like, but is not limited thereto. The battery cell may supply power to a target device (not shown). To this end, the battery cell may be electrically connected to the target device. Here, the target device may include an electrical, electronic, or mechanical device operated by receiving power from a battery pack (not shown) including a plurality of battery cells. For example, the target device may be, but is not limited to, small products such as digital cameras, P-DVDs, MP3P, mobile phones, PDAs, portable game devices, Power Tools, and E-bikes, as well as large products requiring high power such as electric or hybrid vehicles, power storage devices for storing excess generated power or renewable energy, or backup power storage devices.

A battery cell may include an electrode assembly, a battery case in which the electrode assembly is accommodated, and an electrolyte injected into the battery case to activate the electrode assembly. The electrode assembly is formed by interposing a separator between a cathode plate formed by coating a cathode current collector with a cathode active material and a anode plate formed by coating a anode current collector with a anode active material, and depending on the type of battery case, the electrode assembly may be manufactured in a jelly roll type or stack type and accommodated inside the battery case. The battery case serves as an exterior material that maintains the shape of the battery and protects the battery from external impact, and battery cells may be classified into cylindrical, prismatic, and pouch types according to the type of battery case.

According to an example embodiment, a battery cell may be manufactured through a series of manufacturing processes including an electrode manufacturing process, an assembly process, and a chemical conversion process. Here, the assembly process may include a process of assembling the cathode plate and the anode plate made through the electrode manufacturing process and injecting the electrolyte, and it may include a notching process, a winding process, an assembly process, and a packaging process.

The packaging process may be defined as a process of injecting an electrode assembly and an electrolyte into a battery case and sealing it. A cylindrical battery cell is manufactured by mounting an electrode assembly in a cylindrical metal can, welding an anode tab extended from an anode of the electrode assembly to a lower end of the can, and welding a cathode tab extended from a cathode of the electrode assembly to a top cap of the cap assembly while the electrode assembly and an electrolyte are embedded.

However, if the welded portions of the electrode assembly's cathode tab and cap assembly's top cap are removed due to an impact applied from the outside of the battery cell or poor welding, i.e., if the cathode tab and top cap are weakly welded, the battery cell my deteriorate or explode so it is important to inspect battery cells to ensure that defectively welded battery cells do not leak.

Hereinafter, the battery processing system will be described with an exemplary assembly processing system.

FIG. 1 is a diagram for describing a battery processing system according to an example embodiment disclosed in this document.

With reference to FIG. 1, a battery processing system may include a monitoring apparatus 100 and at least one process processing device 210, 220, and 230.

The monitoring apparatus 100 may collect and analyze data of at least one process processing device 210, 220, and 230 operating in the battery processing system in real time. The monitoring apparatus 100 may collect and analyze data of at least one process processing device 210, 220, and 230.

For example, the monitoring apparatus 100 may collect and analyze data or graph data generated in the battery processing system, such as a battery processing system process progress status, whether an alarm has occurred or not, temperature, pressure, quantity, and the like.

The monitoring apparatus 100 may obtain an image of at least one process processing device 210, 220, and 230 that is captured by a plurality of camera modules (not shown).

The monitoring apparatus 100 may determine whether a battery cell is defective based on an image obtained by capturing at least one process processing device 210, 220, and 230. According to an example embodiment, the monitoring apparatus 100 may determine whether the cathode tab of the battery cell and the top cap are weakly welded based on the image of the at least one process processing device 210, 220, and 230.

The at least one processing unit 210, 220, and 230 may include the first process processing device 210, the second process processing device 220, and the third process processing device 230. Although the at least one process processing device 210, 220, and 230 is illustrated as three process processing devices, the present invention is not limited thereto. According to an example embodiment, at least one process processing device 210, 220, and 230 may include n devices (n is a natural number equal to or greater than 1).

According to an example embodiment, the at least one process processing device 210, 220, and 230 may weld the cathode tab of the electrode assembly of the battery cell and the top cap of the cap assembly.

Figure 2:
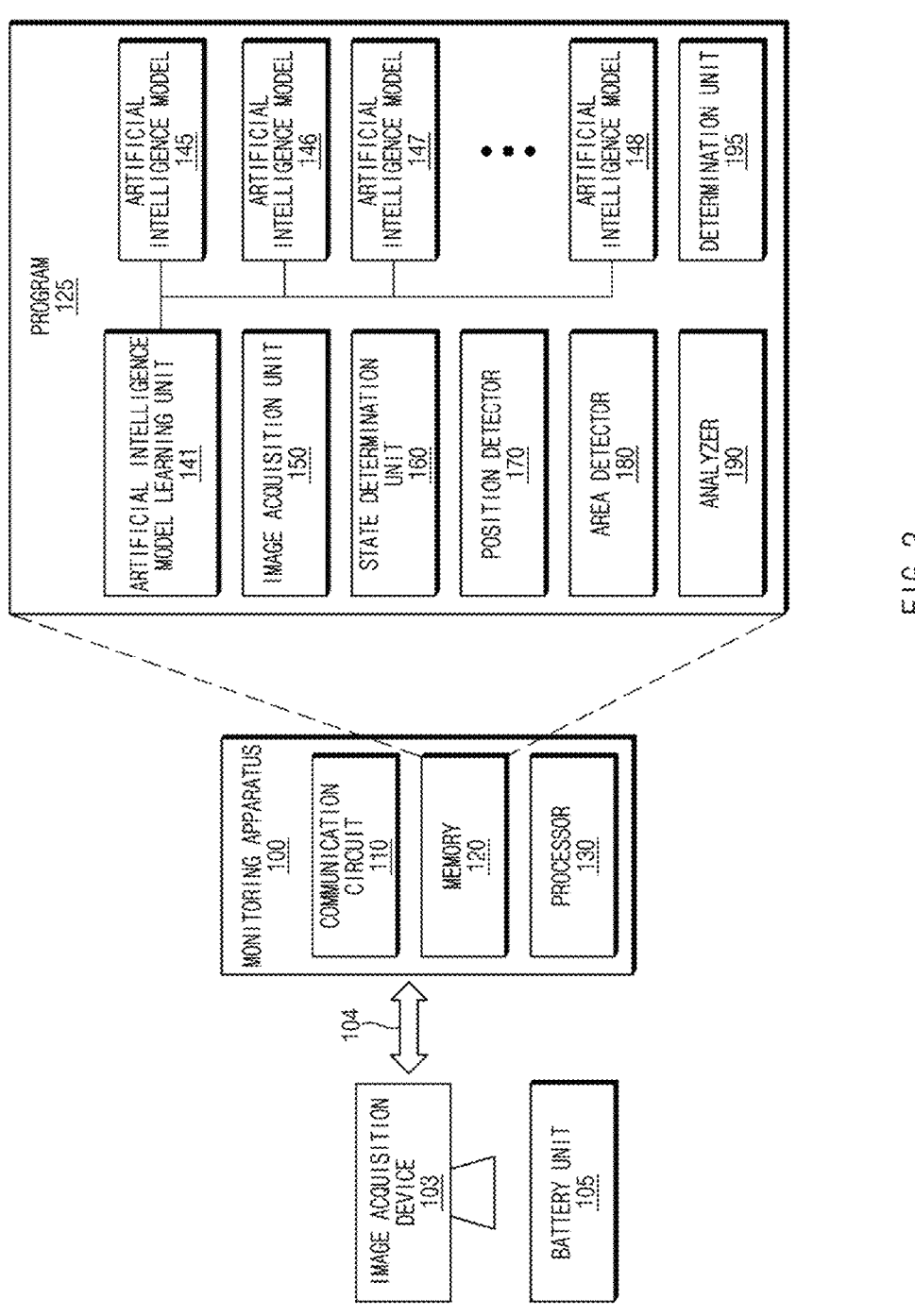
FIG. 2 is a block diagram illustrating a configuration of a monitoring apparatus according to an example embodiment disclosed in this document.

FIG. 2 is a block diagram illustrating a configuration of a monitoring apparatus 100 according to an example embodiment disclosed in this document.

In an example embodiment, the monitoring apparatus 100 may determine the state of the battery unit 105 based on the image of the battery unit 105 acquired by the image acquisition device 103. Here, the image acquisition device 103 may correspond to a plurality of camera modules (not shown) described with reference to FIG. 1. Here, the battery unit 105 may be a battery cell.

In an example embodiment, the monitoring apparatus 100 may determine the state of the battery unit 105 based on a rule-based inspection result and/or an artificial intelligence model-based inspection result for the battery unit 105. In an example embodiment, the rule-based inspection may include inspecting at least one of the presence or absence of a can of the battery unit 105, the presence or absence of a top cap of the can assembly, the inter-center distance between the can and the top cap, the position of the cathode tab, or the presence or absence of over-welding. In an example embodiment, the artificial intelligence model-based inspection may include inspecting at least one of the presence or absence of a top cap of the cap assembly, a welding position, a welding area, or a welding shape.

In an example embodiment, the monitoring apparatus 100 may determine that the state of the battery unit 105 is good when both the rule-based inspection result and the artificial intelligence model-based inspection result for the battery unit 105 indicate normal. In an example embodiment, the monitoring apparatus 100 may determine that the state of the battery unit 105 is defective when at least one inspection result of the rule-based inspection result or the artificial intelligence model-based inspection result for the battery unit 105 indicates a defect.

Hereinafter, components of the monitoring apparatus 100 will be schematically described, and then the operation method of the monitoring apparatus 100 will be described in detail.

With reference to FIG. 2, the monitoring apparatus 100 may include a communication circuit 110, a memory 120, and a processor 130. According to an example embodiment, the monitoring apparatus 100 shown in FIG. 2 may further include at least one component (e.g., a display, an input device, or an output device) in addition to the components illustrated in FIG. 2.

In an example embodiment, the communication circuit 110 may establish a wired communication channel and/or a wireless communication channel between the monitoring apparatus 100 and the image acquisition device 103 and transmit and receive data to and from the image acquisition device 103 through the established communication channel.

In an example embodiment, the memory 120 may include volatile memory and/or nonvolatile memory.

In an example embodiment, the memory 120 may store data used by at least one component (e.g., the processor 130) of the monitoring apparatus 100. For example, the data may include the program 125 (or instructions related thereto), input data, or output data. In an example embodiment, when executed by the processor 130, the instruction may cause the monitoring apparatus 100 to perform operations defined by the instructions.

In an example embodiment, the memory 120 may include the program 125 (e.g., an artificial intelligence model learning unit 141, artificial intelligence models 145, 146, 147, and 148, an image acquisition unit 150, a state determination unit 160, a position detector 170, an area detector 180, an analyzer 190, and/or a determination unit 195).

In an example embodiment, the processor 130 may include a central processing unit, an application processor, a graphic processing unit, a neural processing unit (NPU), an image signal processor, a sensor hub processor, or a communication processor.

In an example embodiment, the processor 130 may execute the program 125 (e.g., the artificial intelligence model learning unit 141, the artificial intelligence models 145, 146, 147, and 148, the image acquisition unit 150, the state determination unit 160, the position detector 170, the area detector 180, the analyzer 190, and/or the determination unit 195) to control at least one other components (e.g., hardware or software components) of the monitoring apparatus 100 connected to the processor 130 and perform various data processing or calculations.

In an example embodiment, the artificial intelligence model learning unit 141 may learn the artificial intelligence models 145, 146, 147, and 148 based on training data. In an example embodiment, the artificial intelligence models 145, 146, 147, and 148 may be models learned to generate output products for different purposes based on different learning data.

In an example embodiment, the image acquisition unit 150 may obtain an image of the battery unit 105 from the image acquisition device 103. In an example embodiment, the image acquisition unit 150 may automatically log an image captured by the image acquisition device 103 of at least one process processing device 210, 220, and 230. For example, the image acquisition unit 150 may collect images of at least one process processing device 210, 220, and 230 by setting a sampling period of automatic image data log to 0.1 sec. Here, the image acquisition device 103 may acquire operation data of at least one process processing device 210, 220, and 230. The image acquisition device 103 may acquire an image of at least one process processing device 210, 220, and 230 related to manufacturing the battery unit 105. According to an example embodiment, the image acquisition device 103 may acquire an image in which at least one process processing device 210, 220, and 230 welds the cathode tab of the electrode assembly of the battery unit 105 and the top cap of the cap assembly.

In an example embodiment, the state determination unit 160 may determine the state of the can assembly based on the image of the battery unit 105. In an example embodiment, the position detector 170 may determine the state of the welding position based on the image of the battery unit 105. In an example embodiment, the area detector 180 may detect and/or crop a welding area in the image of the welding position of the battery unit 105. In an example embodiment, the analyzer 190 may analyze a welding state based on a cropped image of a welding position. In an example embodiment, the determination unit 195 may determine whether the battery unit 105 is good in quality based on the determination results of the state determination unit 160, the position detector 170, and/or the analyzer 190.

Hereinafter, a detailed description is made of a method for the monitoring apparatus 100 to determine a state of the battery unit 105 via the artificial intelligence model learning unit 141, artificial intelligence models 145, 146, 147, and 148, the image acquisition unit 150, state determination unit 160, the position detector 170, the area detector 180, the analyzer 190, and/or the determination unit 195 with reference to FIGS. 3 to 8.

Figure 4:
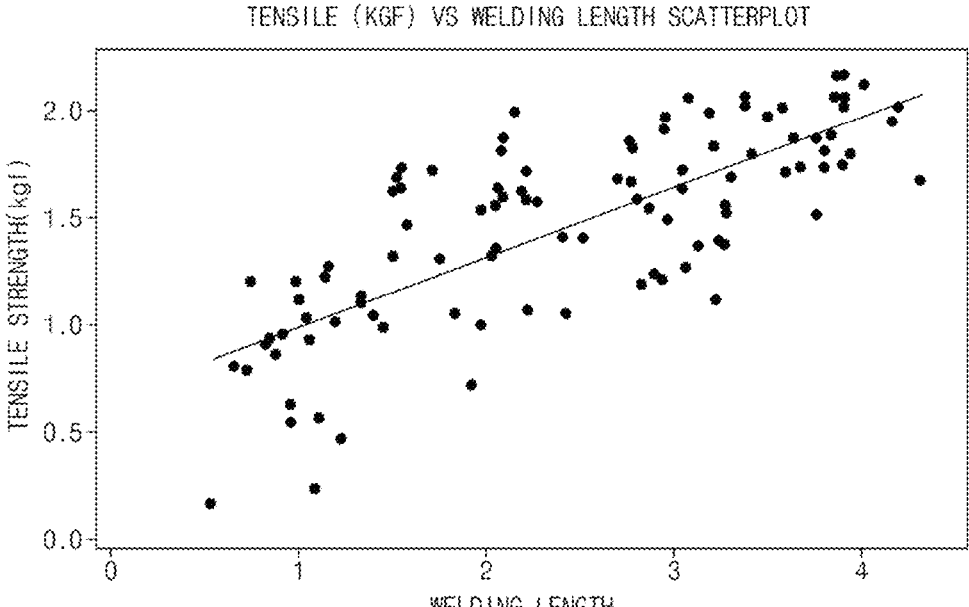
FIG. 4 is a graph illustrating a change in tensile strength in accordance with a change in welding length according to an example embodiment disclosed in this document.

FIG. 3 is a welding state classification table according to an example embodiment disclosed in this document. FIG. 4 is a graph illustrating a change in tensile strength in accordance with a change in welding length according to an example embodiment disclosed in this document.

Whether or not the battery unit 105 is normal may be determined based on various criteria. For example, whether or not the battery unit 105 is normal may be determined based on a criterion related to a welding state and/or a criterion related to tensile strength. The criteria for determining whether the battery unit 105 is normal may be set in advance. For example, the welding state of the battery unit 105 may be determined to be normal when the welding length (or bead length) of at least one welding line is 75% or more of the welding section, and the tensile strength of the battery unit 105 may be determined to be normal when it is 0.4 kgf or more. Here, the welding bead may be deposited metal solidified on a base material when a welding operation is performed along a welding line.

The welding state of the battery unit 105 may be checked through an image of the battery unit 105, but it may be difficult to check the tensile strength of the battery unit 105 through the image.

With reference to FIG. 3, in type #1, the welding state of the battery unit 105 may be determined as normal welding since the welding length of the two welding lines is 100% of the welding section. In type #2, the welding state of the battery unit 105 may be determined as normal welding since the welding length of one welding line is 75% or more of the welding section. And, since the tensile strengths of the battery unit 105 are 1.90 kgf and 1.61 kgf in type #1 and type #2, the battery unit 105 may be determined to be normal.

However, in type #3 and type #4, the welding state of the battery unit 105 may be determined as weak welding since the welding length of the welding line is 50% or more or 50% or less of the welding section. Nevertheless, since the tensile strengths of the battery unit 105 are 1.10 kgf and 0.73 kgf in type #3 and type #4, the battery unit 105 may be determined to be normal.

With reference to type #1, type #2, type #3, and type #4, it can be seen that if the criteria for the welding state are satisfied, the battery unit 105 is highly likely to satisfy the criteria related to tensile strength.

With reference to FIG. 4, it can be seen that the welding length of the battery unit 105 and the tensile strength of the battery unit 105 have a linear proportional relationship. For example, a Pearson correlation coefficient (PCC) between the tensile strength of the battery unit 105 and the welding length of the battery unit 105 may be calculated as 0.764. Here, the Pearson correlation coefficient may be a numerical value quantifying a linear correlation between two variables. That is, the tensile strength of the battery unit 105 may be calculated by multiplying the welding length (mm) of the battery unit 105 by Pearson correlation coefficient of 0.764.

Considering the experimental results of FIGS. 3 and 4, whether or not the criterion related to the tensile strength of the battery unit 105 is satisfied may be determined in consideration of only the criterion related to the welding state of the battery unit 105. Therefore, it can be seen that it is important to determine whether the battery unit 105 meets the criteria for the welding state based on the captured image of the battery unit 105.

Artificial Intelligence Model Learning

Figure 5:
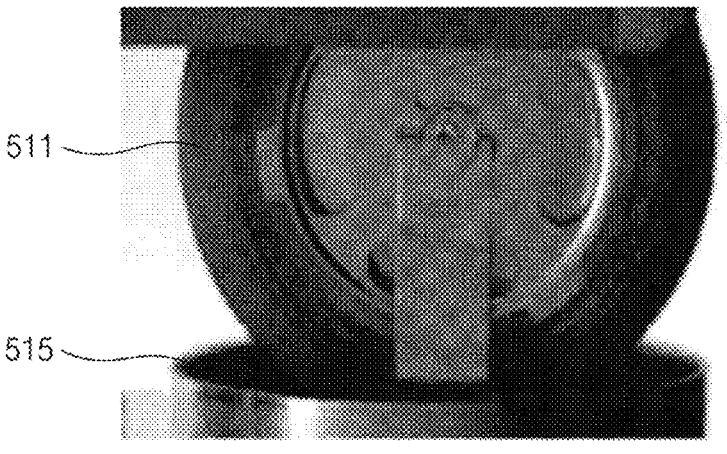
FIG. 5 is a diagram of classifying battery units according to an example embodiment disclosed in this document.
Figure 5:
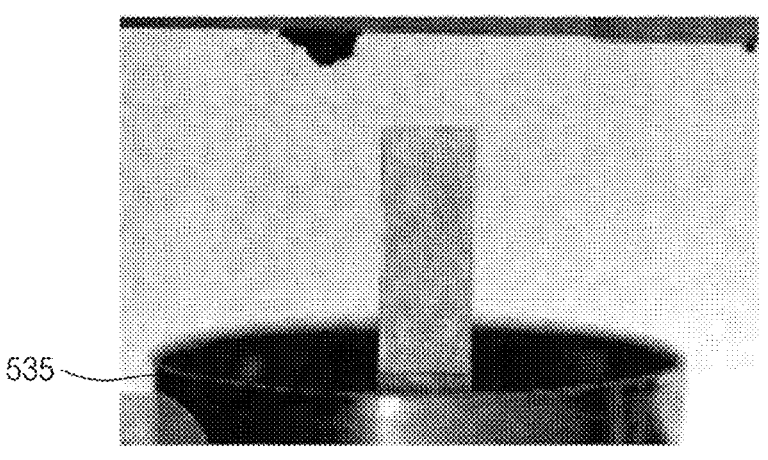
Figure 5:
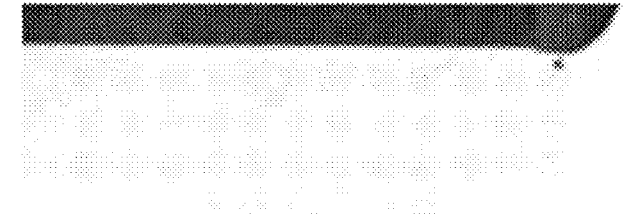

FIG. 5 is a diagram of classifying battery units according to an example embodiment disclosed in this document.

In an example embodiment, the artificial intelligence model learning unit 141 may input an image of the battery unit to the artificial intelligence model 145. In an example embodiment, the artificial intelligence model 145 may be a model capable of multinomial classification (e.g., a model based on a convolutional neural network (CNN)). In an example embodiment, the artificial intelligence model 145 may be trained to classify the presence or absence of the cans 515 and 535 and the top cap 511 based on the images 510, 530, and 550 of the battery unit.

In an example embodiment, the data for training the artificial intelligence model 145 may include the image 510 of the battery unit in which the can 515 and the top cap 511 are normally present, the image 530 of the battery unit in which only the can 535 is present without the top cap, and the image 550 without the can and the top cap. In an example embodiment, the images 510, 530, and 550 used for training the artificial intelligence model 145 may be prepared in advance.

In an example embodiment, the artificial intelligence model 145 may be trained to classify an input image into at least three states based on training data. Here, the at least three states may include a state in which the can and the top cap are normally present, a state in which only the can is present without the top cap, and a state in which the can and the top cap are not present.

Figure 6:
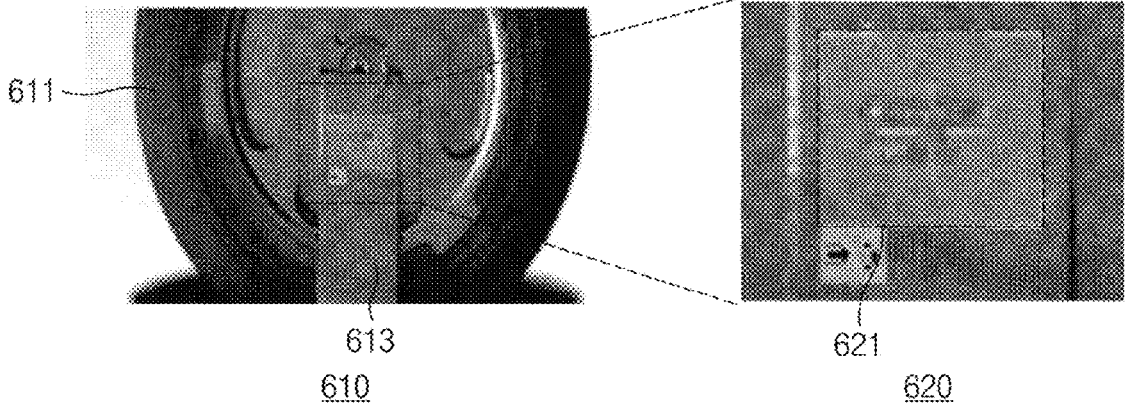
FIG. 6 is a diagram illustrating a welding position of a battery cell according to an example embodiment disclosed in this document.
Figure 6:
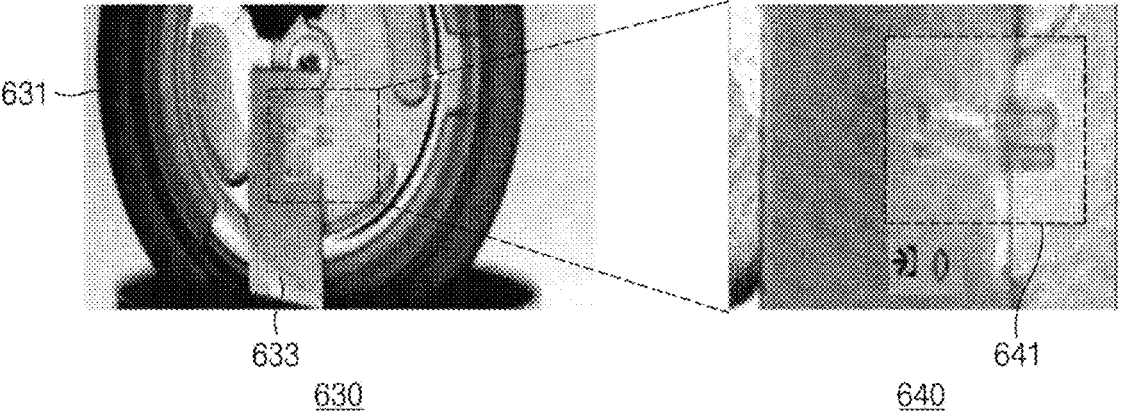

FIG. 6 is a diagram illustrating a welding position of a battery unit according to an example embodiment disclosed in this document. FIG. 6 includes images 610 and 630 of a battery unit including top caps 611 and 631 and cathode tabs 613 and 633, and images 620 and 640 enlarging partial areas of the images 610 and 630.

In an example embodiment, the artificial intelligence model learning unit 141 may input an image of the battery unit to the artificial intelligence model 146. In an example embodiment, the artificial intelligence model 146 may be a model capable of polynomial classification. In an example embodiment, the artificial intelligence model 146 may be trained to identify and/or crop welding positions 621 and 641 based on images 610 and 630 of the battery unit. Here, the welding position may include an area in which welding has been performed.

In an example embodiment, the data for training the artificial intelligence model 146 may include an image 610 in which welding is present only in a region where the top cap 611 and the cathode tab 613 overlap, and an image 630 in which welding is at least partially present in a region where the top cap 631 and the cathode tab 633 do not overlap. In an example embodiment, the images 610 and 630 used for training the artificial intelligence model 146 may be prepared in advance.

In an example embodiment, the artificial intelligence model 146 may be trained to classify an input image into at least two states based on training data. Here, the at least two states may include a state in which welding is present only in a region where the top cap and the cathode tab overlap, and a state in which welding is at least partially present in a region where the top cap and the cathode tab do not overlap.

In an example embodiment, the artificial intelligence model 146 may be trained to crop welding position in the input image based on the training data. For example, the artificial intelligence model 146 may be trained to crop the welding positions 621 and 641 in the images 610 and 630. In an example embodiment, the artificial intelligence model 146 may attach metadata representing at least two states of the input image to the cropped welding positions.

Figure 7:
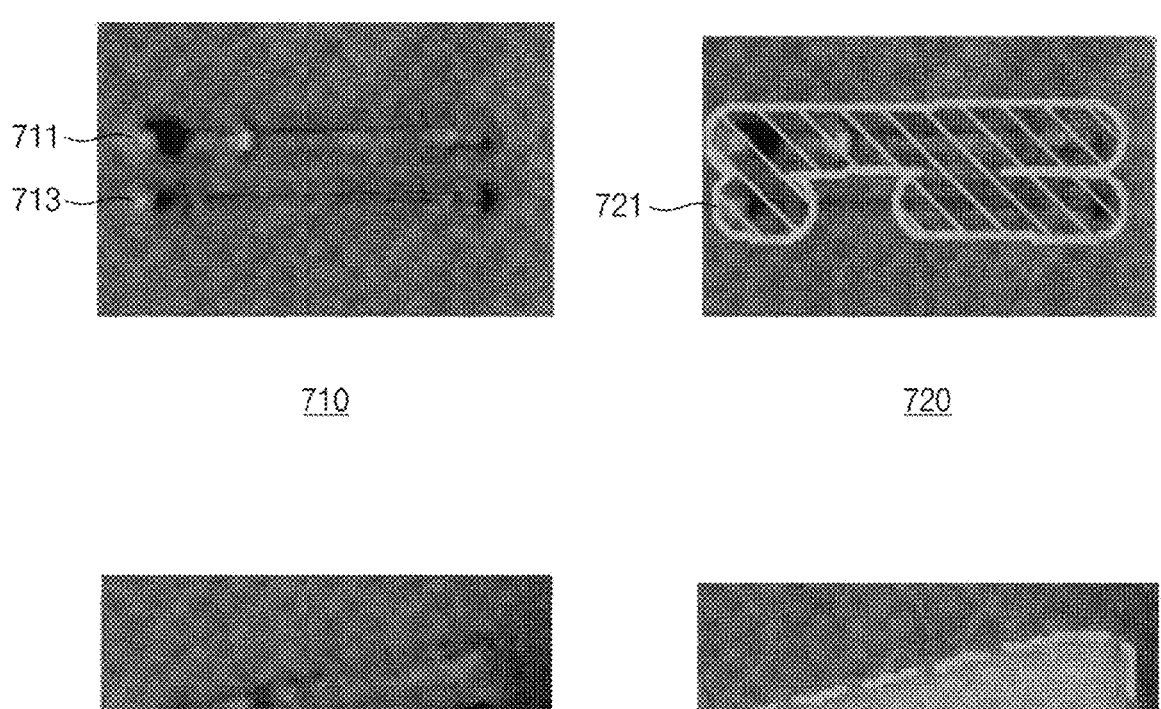
FIG. 7 is a diagram illustrating a welding area of a battery cell according to an example embodiment disclosed in this document.

FIG. 7 is a diagram illustrating a welding area of a battery cell according to an example embodiment disclosed in this document;

In an example embodiment, the artificial intelligence model learning unit 141 may input an image of the battery unit to the artificial intelligence model 147. In an example embodiment, the artificial intelligence model 147 may be a model capable of polynomial classification. In an example embodiment, the artificial intelligence model 147 may be trained to identify and/or crop the welding areas 721 and 741 based on the images 710 and 730 of the battery unit. Here, the welding area may refer to an area in which welding is actually performed among welding sections within a welding position. Here, the welding position may be identified and/or cropped by the artificial intelligence model 146.

In an example embodiment, the data for training the artificial intelligence model 147 may include images of welding positions with welding lengths between 0% and 100% of the welding sections 711, 713, 741, and 743. In an example embodiment, the images 710 and 730 used for training the artificial intelligence model 147 may be prepared in advance.

In an example embodiment, the artificial intelligence model 147 may be trained to identify the welding areas 721 and 741 in the input image based on the training data. In an example embodiment, the artificial intelligence model 147 may be trained to crop welding position in the input image based on the training data. For example, the artificial intelligence model 147 may be trained to crop the welding positions 721 and 741 in the images 710 and 730. In an example embodiment, the artificial intelligence model 147 may be trained to output images 720 and 740 obtained by cropping the welding positions 721 and 741.

Figure 8:
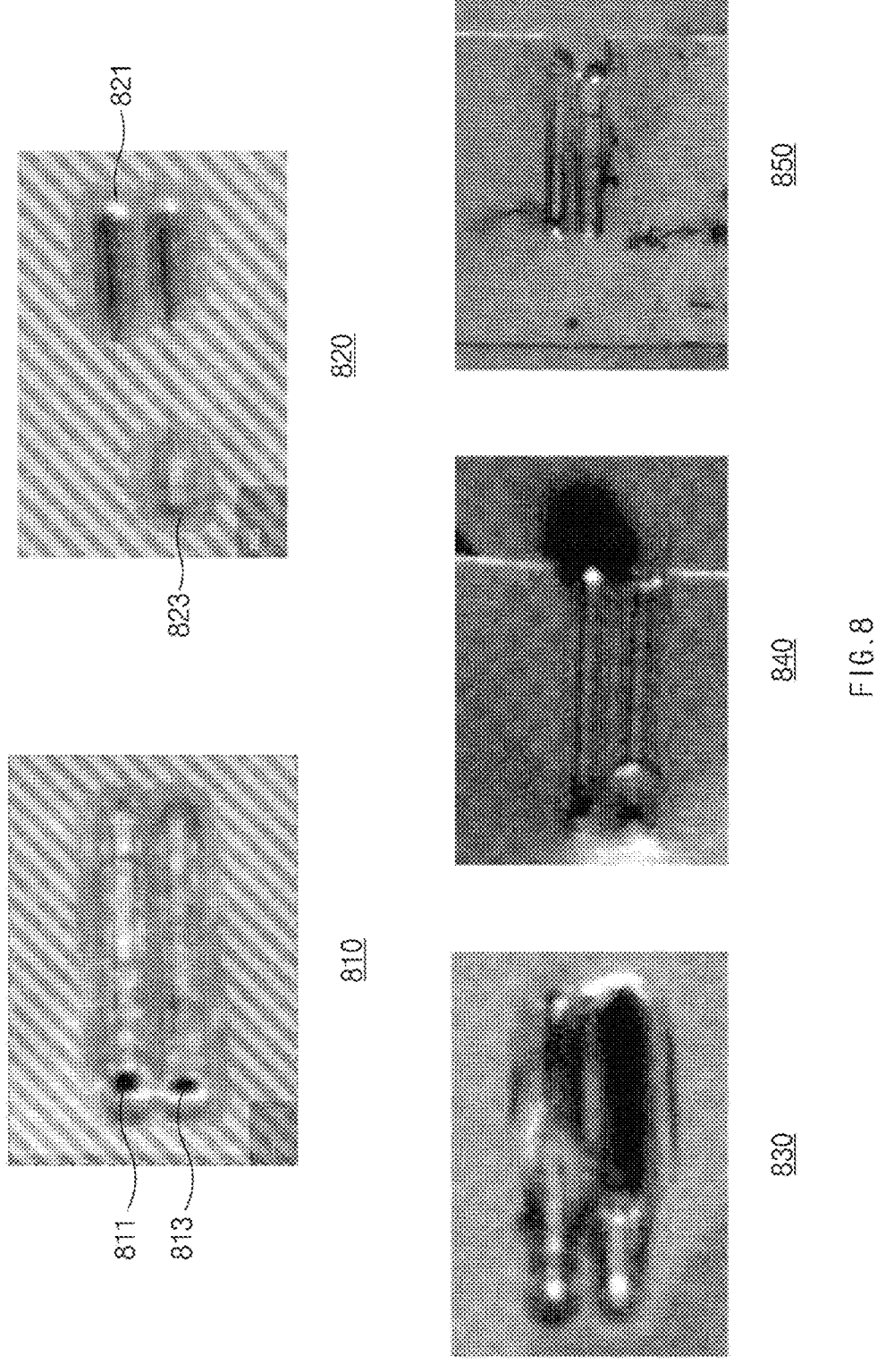
FIG. 8 is a diagram illustrating a welding shape of a battery cell according to an example embodiment disclosed in this document.

FIG. 8 is a diagram illustrating a welding state of a battery cell according to an example embodiment disclosed in this document.

In an example embodiment, the artificial intelligence model learning unit 141 may input an image of the battery unit to the artificial intelligence model 148. In an example embodiment, the artificial intelligence model learning unit 141 may train the artificial intelligence model 148 to classify the welding state of the battery unit based on the cropped welding position image. In an example embodiment, the artificial intelligence model 148 may be a model capable of polynomial classification.

In an example embodiment, the data for training the artificial intelligence model 148 may include an image 810 having a welding length of a reference length range (e.g., 75 to 100%) in welding sections 811 and 813, an image 820 having a welding length of less than the reference length range (e.g., 0 to 75%) in welding sections 811 and 813, and other defective welding images 830, 840, and 850. Here, other defects may include an over-welding state (e.g., a condition having a welding length exceeding a reference length range), a top cap damage state (e.g., top cap burning), or a tap damage state. In an example embodiment, the images 810, 820, 830, 840, and 850 used for training the artificial intelligence model 148 may be prepared in advance.

In an example embodiment, the artificial intelligence model 148 may be trained to classify an input image into at least three states based on training data. Here, the at least three states may include a state having a welding length in a reference length range, a state having a welding length less than the reference length range, and a state having other defects.

State Determination Through Artificial Intelligence Model

In an example embodiment, the state determination unit 160 may determine the state of the can assembly based on the image of the battery unit 105. In an example embodiment, the state determination unit 160 may determine the state of the can assembly by inputting an image of the battery unit 105 to the artificial intelligence model 145. In an example embodiment, the state determination unit 160 may determine the state of the can assembly by inputting an image of the battery unit 105 to the artificial intelligence model 145. For example, the state determination unit 160 may determine the state of the can assembly of the battery unit 105 based on the state of the battery unit 105 classified by the artificial intelligence model 145 (e.g., the state in which the can and the top cap are normally present (e.g., image 510), the state in which only the can is present (e.g., image 530), and the state in which the can and the top cap are not present (e.g., image 550)).

In an example embodiment, when the can and the top cap are normally present in the battery unit 105, the state determiner 160 may determine that the can assembly is in a normal state. In an example embodiment, when only the can is present without the top cap or both the can and the top cap are absent, the state determining unit 160 may determine that the can assembly is in a defective state.

In an example embodiment, the state determination unit 160 may transmit an image of the battery unit 105 in which the state of the can assembly is determined to be normal among a plurality of images to the position detector 170. In an example embodiment, the state determiner 160 may transmit the determination result of the state of the can assembly of the battery unit 105 to the determiner 195.

In an example embodiment, the position detector 170 may detect and/or crop a welding position in an image of the battery unit 105. In an example embodiment, the state determination unit 160 may input an image of the battery unit 105 to the artificial intelligence model 146 to detect and/or crop welding positions (e.g., welding positions 621 and 641).

In an example embodiment, the position detector 170 may determine the state of the welding position based on the image of the battery unit 105. For example, the position detector 170 may determine the welding position of the battery unit 105 based on the state of the battery unit 105 classified by the artificial intelligence model 146 (e.g., the state in which welding is present only in a region where the top cap and cathode tab overlap and the state in which welding is at least partially present a region where the top cap and the cathode tab do not overlap).

In an example embodiment, when welding is present only in a region where the top cap and the cathode tab of the battery unit 105 overlap, the position detector 170 may determine that the welding position is normal. In an example embodiment, when welding is at least partially present in a region where the top cap and the cathode tab do not overlap, the position detector 170 may determine that the welding position is defective.

In an example embodiment, the position detector 170 may transmit an image of the battery unit 105 in which the welding position is determined to be normal among the plurality of images to the area detector 180. In an example embodiment, the position detector 170 may transmit an image of a welding position (e.g., a welding position 621) of the battery unit 105 determined to have a normal welding position among a plurality of images to the area detector 180. In an example embodiment, the position detector 170 may transmit the determination result of the state of the welding position of the battery unit 105 to the determination unit 195.

In an example embodiment, the area detector 180 may detect and/or tag a welding area in an image of a welding position of the battery unit 105. In an example embodiment, the area detector 180 may detect and/or tag a welding area (e.g., welding areas 721 and 741) by inputting images (e.g., images 710 and 730) of the welding position of the battery unit 105 into the artificial intelligence model 147.

In an example embodiment, the area detector 180 may transmit images 720 and 740 tagged with the welding areas 721 and 741 to the analyzer 190.

In an example embodiment, the analyzer 190 may analyze the welding state based on the images tagged with the welding areas. In an example embodiment, the analyzer 190 may analyze a welding state by inputting an image tagged with a welding area to the artificial intelligence model 148. In an example embodiment, the analyzer 190 may determine a welding state of the welding area based on the output of the artificial intelligence model 148. For example, the analyzer 190 may analyze a welding state based on welding states of the welding areas classified by the artificial intelligence model 148 (e.g., state having the welding length within the reference length range (e.g., image 810), state having a welding length less than the reference length range (e.g., 820), and other defective states (e.g., images 830, 840, and 850)).

In an example embodiment, when the battery unit 105 has a welding length within the reference length range, the analyzer 190 may determine that the welding state is normal. In an example embodiment, when the battery unit 105 has a welding length less than the reference length range or has other defects, the analyzer 190 may determine that the welding state is defective.

In an example embodiment, the analyzer 190 may transmit the determination result of the welding state to the determination unit 195.

In an example embodiment, the determination unit 195 may determine whether the battery unit 105 is good or not based on the determination result of the state determination unit 160, the position detector 170, and/or the analyzer 190. For example, when the determination results of the state determination unit 160, the position detector 170, and the analyzer 190 all indicate normal, the determination unit 195 may determine that the battery unit 105 is a good product. For example, when the determination result of at least one of the state determination unit 160, the position detector 170, or the analyzer 190 indicates a defect, the determination unit 195 may determine that the battery unit 105 is not a good product.

Additionally, the determination unit 195 may determine whether the battery unit 105 is a good product on the basis of a determination result based on a rule-based inspection as well as a determination result based on an artificial intelligence model. Here, the rule-based inspection may be an inspection that determines whether the battery unit 105 is defective based on the gray level information of the image of the battery unit 105.

For example, the determination unit 195 may generate a determination result by determining at least one of the presence or absence of a can in the battery unit 105, the presence or absence of a top cap, the center distance between the can and the top cap, the position of cathode tab, and the over-welding of cathode tab, based on the gray level information of the image of battery unit 105. According to an example embodiment, the determination unit 195 may sequentially determine the presence or absence of a can in the battery cell, the presence or absence of a top cap, the center distance between the can and the top cap, the position of a cathode tab, and whether the cathode tab is over-welded, based on the gray level information of the image of the battery unit 105. The determination unit 195 may generate a determination result on whether the battery cell is over-welded, whether the top cap is sooty, or whether the tab is damaged, based on at least one of the presence or absence of a can in the battery cell, the presence or absence of a top cap, the center distance between the can and the top cap, the position of a cathode tab, and whether the cathode tab is over-welded, which is determined on the basis of the gray level information of the image of the battery unit 105. The determination unit 195 may determine whether the battery unit 105 is defective based on the artificial intelligence model-based inspection determination result and the rule-based inspection determination result. That is, the determination unit 195 may finally determine whether the battery unit 105 is defective based on the determination result of weak welding of the battery unit 105 and the determination result of over-welding of the battery unit 105.

According to an example embodiment, the determination unit 195 may determine whether the battery unit 105 is defective based on the previously stored image file. In detail, the determination unit 195 may determine whether the battery unit 105 is defective based on the previously stored image file of the defective battery unit. Here, the image file of the defective battery unit may include an image of a weakly welded battery unit, an image of a battery unit where the soot size is determined to be above the reference size as an over-welding, an image of a battery unit where the degree of soot is determined to be above the reference degree, an image of a battery unit determined to be lumped with a welding area, and an image of a battery unit determined to have top cap intrusion. Accordingly, the determination unit 195 may determine whether the battery unit is defective based on the defective battery unit image file.

As described above, the monitoring apparatus 100 according to an example embodiment disclosed in this document may detect a defective battery unit by accurately analyzing a welding state of the battery unit.

The monitoring apparatus 100 is capable of improving weak welding defect detection capability for a battery unit, by solving the problem in clearly classifying the welding area due to the gray level noise of the image of the processing device manufacturing the battery unit by using deep learning algorithms in a superimposing manner.

In addition, the monitoring apparatus 100 is capable of improving the stability and quality of a product on which the battery unit is mounted by preventing leakage of the weakly welded battery unit.

Furthermore, the monitoring apparatus 100 is capable of reducing the cost and time of detecting defects by determining whether the battery unit is defective in real time without providing or connecting a separate device.

Although the various program modules of program 125 are depicted as separate in FIG. 2, this is only an example. In an example embodiment, the state determination unit 160, the position detector 170, the area detector 180, and/or the analyzer 190 may be integrated into one program module. For example, the state determination unit 160, the position detector 170, the area detector 180, and/or the analyzer 190 may be integrated into the analyzer 190.

Although the artificial intelligence models of the program 125 are shown as separate in FIG. 2, this is only an example. In an example embodiment, the artificial intelligence models 145, 146, 147, and 148 may be implemented as one artificial intelligence model.

Figure 9:
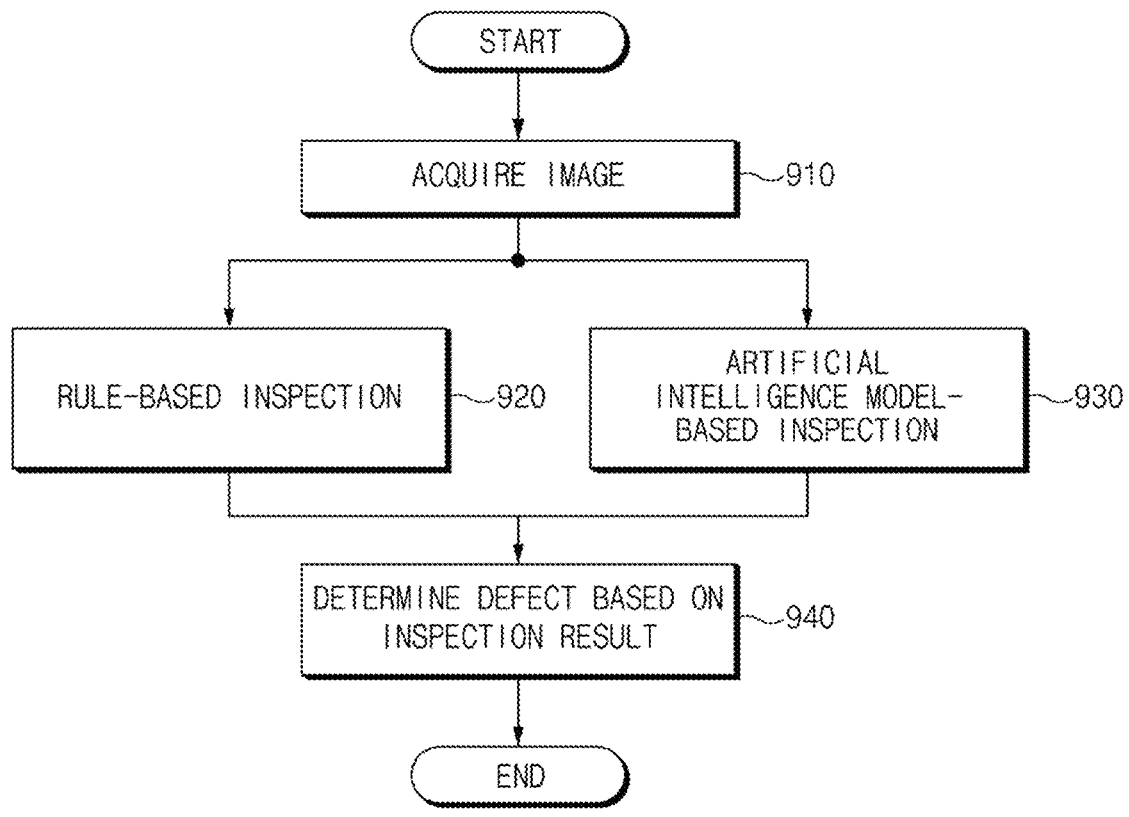
FIG. 9 is a flowchart illustrating an operation method of a monitoring apparatus according to an example embodiment disclosed in this document.

FIG. 9 is a flowchart illustrating an operation method of a monitoring apparatus 100 according to an example embodiment disclosed in this document. FIG. 9 may be described with reference to FIGS. 2 to 8.

With reference to FIG. 9, the monitoring apparatus 100 may acquire an image at operation 910. Here, the image may be an image of the battery unit 105 that acquired by the image acquisition device 103.

At operation 920, the monitoring apparatus 100 may perform a rule-based inspection. In an example embodiment, the monitoring apparatus 100 may perform a rule-based inspection based on gray level information of the image.

For example, the monitoring apparatus 100 may generate a determination result by determining at least one of the presence or absence of a can in the battery unit 105, the presence or absence of a top cap, the center distance between the can and the top cap, the position of cathode tab, and whether the cathode tab is over-welded, based on the gray level information of the image of battery unit 105. According to an example embodiment, the monitoring apparatus 100 may sequentially determine the presence or absence of a can in the battery cell, the presence or absence of a top cap, the center distance between the can and the top cap, the position of a cathode tab, and whether the cathode tab is over-welded, based on the gray level information of the image of the battery unit 105. The monitoring apparatus 100 may generate a determination result on whether the battery cell is over-welded, whether the top cap is sooty, or whether the tab is damaged, based on at least one of the presence or absence of a can in the battery cell, the presence or absence of a top cap, the center distance between the can and the top cap, the position of a cathode tab, and whether the cathode tab is over-welded, which is determined on the basis of the gray level information of the image of the battery unit 105.

At operation 930, the monitoring apparatus 100 may perform an artificial intelligence model-based inspection. For example, the monitoring apparatus 100 may perform an artificial intelligence model-based inspection on an image based on the previously trained artificial intelligence models 145, 146, 147, and 148.

In an example embodiment, the monitoring apparatus 100 may determine the state of the can assembly based on the image of the battery unit 105. In an example embodiment, the monitoring apparatus 100 may determine the state of the welding position based on the image of the battery unit 105. In an example embodiment, the monitoring apparatus 100 may analyze a welding state based on a cropped image of a welding position.

At operation 940, the monitoring apparatus 100 may determine whether a defect is present based on the inspection result.

In an example embodiment, when both the result of the rule-based inspection and the result of the artificial intelligence model-based inspection are normal, the monitoring apparatus 100 may determine that the battery unit 105 is a good product.

The above description is only an illustrative example of the technical idea of the present disclosure, and those skilled in the art to which the present disclosure belongs will be able to make various modification and changes without departing from the subject matter of the present disclosure.

Therefore, the example embodiments disclosed in the present disclosure are not intended to limit but to describe the technical idea of the present disclosure, and the scope of the technical idea of the present disclosure is not limited by the example embodiments. The scope of protection of technical ideas of the present disclosure shall be construed by the following claims, and all technical ideas within the scope equivalent thereto shall be construed as being within the scope of the rights of the present disclosure.

The invention claimed is:

1. A monitoring apparatus, comprising:
   an image acquirer configured to acquire an image of at least one process processing device in manufacturing of a battery cell;
   an analyzer configured to input the acquired image into an artificial intelligence model for determining a welding state of the battery cell to generate a first determination result of determining whether the battery cell is defective; and
   a determinator configured to determine whether the battery cell is defective based on the first determination result.

2. The apparatus of claim 1, wherein the determinator is further configured to generate a second determination result of determining whether the battery cell is defective based on gray level information of the acquired image.

3. The apparatus of claim 2, wherein the determinator is further configured to determine whether the battery cell is defective based on the first and second determination results.

4. The apparatus of claim 2, wherein the determinator is further configured to generate the second determination result by determining at least one of a presence or absence of a can of the battery cell, a presence or absence of a top cap of the battery cell, a center distance between the can and the top cap of the battery cell, a position of a cathode tab of the battery cell, and whether the cathode tab is over-welded, based on the gray level information of the acquired image.

5. The apparatus of claim 1, wherein the artificial intelligence model comprises an artificial intelligence model configured to detect a welding area of the battery cell based on the acquired image and an artificial intelligence model configured to analyze a welding state of the welding area.

6. The apparatus of claim 5, wherein the artificial intelligence model configured to analyze the welding state of the welding area is further configured to classify the welding state into a state having a welding length within a reference length range, a state having a welding length less than the reference length, and a state having other defects.

7. The apparatus of claim 1, wherein the artificial intelligence model comprises an artificial intelligence model configured to determine a state of a can assembly of the battery cell based on the acquired image and an artificial intelligence model configured to detect and/or crop a welding position in the acquired image in response to the state of the can assembly being normal.

8. An operation method of a monitoring apparatus, the method comprising:
   acquiring an image of at least one process processing device in manufacturing of a battery cell;
   generating a first determination result of determining whether the battery cell is defective by inputting the acquired image to an artificial intelligence model configured to determine a welding state of the battery cell;
   generating a second determination result of determining whether the battery cell is defective based gray level information of the acquired image; and
   determining whether the battery cell is defective based on the first and second determination results.

9. The method of claim 8, wherein the artificial intelligence model comprises an artificial intelligence model configured to detect a welding area of the battery cell based on the acquired image and an artificial intelligence model configured to analyze a welding state of the welding area.

10. The method of claim 9, wherein the artificial intelligence model configured to analyze the welding state of the welding area is further configured to classify the welding state into a state having a welding length within a reference length range, a state having a welding length less than a reference length range, and a state having other defects.

11. The method of claim 9, wherein the generating of the second determination result comprises generating the second determination result by determining at least one of a presence or absence of a can of the battery cell, a presence or absence of a top cap of the battery cell, a center distance between the can and the top cap of the battery cell, a position of a cathode tab of the battery cell, and whether the cathode tab is over-welded, based on the gray level information of the acquired image.

12. The method of claim 8, wherein the artificial intelligence model comprises an artificial intelligence model configured to determine a state of a can assembly of the battery cell based on the acquired image and an artificial intelligence model configured to detect and/or crop a welding position in the acquired image in response to the state of the can assembly being normal.

* * * * *